United States Patent [19]
Murakami

[11] Patent Number: 5,847,764
[45] Date of Patent: Dec. 8, 1998

[54] REDUCTION OF IMAGE INFORMATION DISTORATION BY ADAPTIVELY BAND-LIMITING THE IMAGE INFORMATION AS A FUNCTION OF AT LEAST A QUANTIZING VALUE

[75] Inventor: Yoshihiro Murakami, Kanagawa, Japan

[73] Assignee: Sony Corporation, Tokyo, Japan

[21] Appl. No.: 931,328

[22] Filed: Sep. 16, 1997

Related U.S. Application Data

[63] Continuation of Ser. No. 583,548, Jan. 5, 1996, abandoned.

[30] Foreign Application Priority Data

Jan. 10, 1995 [JP] Japan .................................. 7-002188

[51] Int. Cl.$^6$ ............................. H04N 7/12; H04N 11/02; H04N 11/04
[52] U.S. Cl. ......................... 348/416; 348/420; 348/403; 348/400
[58] Field of Search ..................... 348/384, 390, 348/400–2, 407, 409–413, 415, 416, 699, 607, 620, 618, 180; 382/232, 236, 238, 252, 233, 275; H04N 7/130

[56] References Cited

U.S. PATENT DOCUMENTS

| | | | |
|---|---|---|---|
| 4,941,043 | 7/1990 | Jass | 358/133 |
| 5,001,560 | 3/1991 | Ericsson | 358/133 |
| 5,136,376 | 8/1992 | Yagasaki et al. | 358/133 |
| 5,144,426 | 9/1992 | Tanaka et al. | 358/133 |
| 5,184,316 | 2/1993 | Sugiyama | 364/715.02 |
| 5,235,419 | 8/1993 | Krause | 358/135 |
| 5,311,310 | 5/1994 | Jozawa et al. | 348/416 |
| 5,353,062 | 10/1994 | Maeda | 348/412 |
| 5,367,629 | 11/1994 | Chu et al. | 395/162 |
| 5,384,849 | 1/1995 | Jeong | 380/49 |
| 5,396,567 | 3/1995 | Jass | 382/56 |
| 5,410,350 | 4/1995 | Kato et al. | 348/400 |
| 5,410,553 | 4/1995 | Choon | 371/31 |
| 5,412,431 | 5/1995 | Vogel | 348/405 |
| 5,430,490 | 7/1995 | Rim | 348/452 |
| 5,453,791 | 9/1995 | Ohki | 348/416 |
| 5,479,211 | 12/1995 | Fukuda | 348/405 |
| 5,481,310 | 1/1996 | Hibi | 348/413 |
| 5,510,785 | 4/1996 | Segawa et al. | 341/67 |
| 5,534,927 | 7/1996 | Shishikui et al. | 348/400 |
| 5,543,843 | 8/1996 | Kato et al. | 348/400 |
| 5,550,847 | 8/1996 | Zhu | 371/32 |

*Primary Examiner*—Douglas W. Olms
*Assistant Examiner*—David R. Vincent
*Attorney, Agent, or Firm*—Frommer Lawrence & Haug, LLP; William S. Frommer

[57] ABSTRACT

An image signal processing system includes an encoding apparatus having a data compressing circuit for compressing input image data and a recording unit for recording compressed image data from the data compressing circuit on a magnetic tape, and a decoding apparatus having a data expanding circuit for decoding the compressed image data recorded on the magnetic tape to restore original image data. A distortion suppressing circuit is connected in a stage following the data expanding circuit for adaptively band-limiting the restored image data based on motion vector data detected in a motion compensation process, detected vector information, and editing information detected by a detecting circuit in a recording decoder in the data expanding circuit.

23 Claims, 11 Drawing Sheets

REDUCTION OF IMAGE INFORMATION DISTORATION BY ADAPTIVELY BAND-LIMITING THE IMAGE INFORMATION AS A FUNCTION OF AT LEAST A QUANTIZING VALUE

This application is a continuation of application Ser. No. 08/583,548, filed on Jan. 5, 1996 now abandoned.

BACKGROUND OF THE INVENTION

The present invention relates to a system for and a method of processing an image signal, and more particularly to a system for and a method of processing an image signal in a digital video tape recorder (VTR) or the like based on the principles of image data compression.

There has recently been proposed an image signal processing system for transmitting or storing highly defined images on a recording medium such as a magnetic tape, a magneto-optical disk, or the like. Such an image signal processing system achieves image data compression through transform coding (block coding) and variable-word-length coding.

Image signals in a spatial domain represent image samples that appear with uniform probability, i.e., are not biased, in the direction of amplitudes as indicated by a statistical review of various images. On the other hand, image signals as viewed in a coefficient domain after having been subjected to transform coding, e.g., discrete cosine transform (DCT), have more energy concentrated as the degree is lower and less energy as the degree is higher, i.e., are largely biased, well reflecting the property of images in terms of frequencies.

The technique of variable-word-length coding uses such biasing to compress image data efficiently. A process of orthogonal transform such as DCT creates such biasing.

Image signals that are used in the art have different degrees of biasing depending on the type thereof. Therefore, information which has been obtained as a result of variable-word-length coding also varies depending on the degree of biasing. One existing process of keeping such information in a certain quantity in terms of fields or frames, for example, is a requantizing process for requantizing information with respect to coefficients. The requantizing process is accompanied by distortions whereas the variable-word-length coding process is a distortion-free transform.

The transform coding process is basically realized by reducing the redundancy of image data. However, merely reducing the redundancy of image data is not enough to keep the image data at a desired fixed rate. It is thus necessary to compress the amount of image data through distortion-producing requantization and adjust the total amount of compressed image data. The more complex the image pattern to be processed by the orthogonal transform, the greater the amount of image data that is compressed by requantization.

It is better for the compression of image data if events of the image data that are visually less susceptible are distorted. Prior to being subjected to the orthogonal transform, the events exist in the spatial domain. If the image data are requantized in the spatial domain, then gradation dropouts will be produced. Because the human eye is sensitive to gradation dropouts in the spatial domain, the requantization of the image data in the spatial domain cannot be employed.

After being subjected to the orthogonal transform, the events exist in the coefficient domain. If the image data are requantized in the coefficient domain, then coefficient dropouts will occur. In the spatial domain, such coefficient dropouts appear as dropouts of correlation between samples of blocks, i.e., waveform distortions. Since the human eye is less sensitive to waveform distortions, it is advantageous to effect distortion-producing requantization on image data in the coefficient domain.

One conventional image signal processing system which has been incorporated in a digital VTR based on the principles of image data compression will be described below with reference to FIGS. 1 and 2 of the accompanying drawings.

The conventional image signal processing system comprises an encoding apparatus and a decoding apparatus. As shown in FIG. 1, the encoding apparatus comprises a data compressing circuit 201 for compressing inputted image data Dv and a recording unit 202 for converting compressed image data dv outputted from the data compressing circuit 201 into a signal form for being recorded on a magnetic tape and recording the compressed image data dv on the magnetic tape.

The data compressing circuit 201 has a DCT circuit 211 for subjecting the inputted image data Dv to a discrete cosine transform, a quantizer 212 for requantizing coefficient data outputted from the DCT circuit 211, a variable-word-length encoder 213 for converting a quantized level from the quantizer 212 into a variable-word-length code for data compression, and a recording encoder 214 for converting variable-word-length code data from the variable-word-length encoder 213 into a recording code.

Although not shown, the recording encoder 214 comprises an error-correcting-code (ECC) encoder for converting the variable-word-length code data from the variable-word-length encoder 213 into blocks such that the data will be of a product code of ECCs, and adding an outer parity code and an inner parity code to the blocked data.

Although not shown, the recording unit 202 comprises a channel encoder for converting the data with the added parity codes into serial data, an amplifier for amplifying the serial data outputted from the channel encoder, and a recording magnetic head for magnetically recording the amplified serial data from the amplifier on a magnetic tape based on the helical scan principles.

The encoding apparatus also has a quantization control circuit 215 for receiving code quantity information from the variable-word-length encoder 213 and adjusting a quantizing parameter (a quantizing value Qd in a quantizing table) in the quantizer 212. The quantization control circuit 215 serves to adjust the quantity (code quantity) of the variable-word-length code data from the variable-word-length encoder 213. Details of the quantization control circuit 215 are disclosed in U.S. Pat. No. 4,894,713, for example.

As shown in FIG. 2, the decoding apparatus comprises a reproducing unit 221 for reproducing recorded data Wd magnetically recorded on a magnetic tape and converting the recorded data Wd into a signal form (compressed image data dv) for being decoded subsequently, and a data expanding circuit 222 for expanding (error-correcting and decoding) reproduced data dv from the reproducing unit 221 into data prior to being compressed, i.e., reproduced image data Dv.

Although not shown, the reproducing unit 221 comprises a playback magnetic head for reproducing the data Wd magnetically recorded on the magnetic tape as serial data, an amplifier for amplifying the serial data from the playback magnetic head, and a channel decoder for detecting the amplified serial data from the amplifier and converting the serial data into parallel data.

The data expanding circuit 222 has a recording decoder 231 for decoding the parallel data from the channel decoder in the reproducing unit 221, a variable-word-length decoder 232 for decoding variable-word-length code data from the recording decoder 231, an inverse quantizer 233 for inversely quantizing a quantized level from the variable-word-length decoder 232 into coefficient data, and an inverse discrete cosine transform (IDCT) circuit 234 for converting the coefficient data from the inverse quantizer 233 into 8×8 block data according to an inverse discrete cosine transform.

Restored image data Dv are produced from an output terminal φout of the data expanding circuit 222.

The recording decoder 231 in the data expanding circuit 222 has an ECC decoder for error-correcting the compressed image data dv based on an inner parity code and an outer parity code which have been added to the parallel data from the channel decoder in the reproducing unit 221, and dividing the error-corrected data into words of a variable-word-length code.

For utilizing pixel correlation as much as possible, one entire frame should ideally be converted into one frequency range through one cycle of an orthogonal transform. However, since the amount of calculations needed for a two-dimensional transform increases in proportion to $2N^{3/2}$ where N is the number of pixels, it is customary to divide a frame into small blocks each composed of 8×8 pixels and subjecting each of the blocks to a discrete cosine transform for preventing the amount of calculations from being increased.

Since the blocks are encoded independently of each other, the DC components of the blocks tend to deviate from each other, and the junctions between the blocks are likely to be discontinuous. Such phenomena are generally referred to as a block distortion.

One way of avoiding the block distortion is to reduce a DCT block distortion with a spatial low-pass filter. Use of a spatial low-pass filter, however, results in a degradation of image quality as the spatial low-pass filter attenuates high-frequency components, especially, of image data itself as well as the DCT block distortion.

While a process of suppressing high-frequency components in the time domain is available as a noise suppressing filter, it is apt to cause a degradation of image quality at edges of moving images.

There has heretofore been available no process capable of effectively reducing distortions which vary with time that are most conspicuous in the compression of moving images, e.g., DCT mosquito noise.

SUMMARY OF THE INVENTION

It is therefore an object of the present invention to provide a system for and a method of processing an image signal to effectively reduce distortions which vary with time without imparting a large degradation of image quality to images.

Another object of the present invention is to provide a system for and a method of processing an image signal by adaptively filtering the image signal based on a variable (quantizing value) upon encoding or a parameter upon vector detection for effectively suppressing only distortions caused by image compression.

According to an aspect of the present invention, there is provided a system for processing an image signal, comprising an encoding apparatus having image compressing means for compressing inputted image information and means for transmitting and storing compressed image information from the image compressing means, a decoding apparatus having image expanding means for decoding the compressed image information which has been transmitted and stored so as to restore the inputted image information, and outputting restored image information, and distortion suppressing means for adaptively band-limiting the restored image information in the time domain based on distortion predicting information with respect to the restored image information.

In the distortion suppressing means, the restored image information is band-limited in the time domain based on distortion predicting information with respect to the restored image information. Therefore, it is possible to effectively reduce distortions which vary with time without imparting a large degradation of image quality to images, and also to effectively suppress only distortions caused by image compression because of the adaptive band-limiting capability.

The decoding apparatus has motion compensating means for effecting motion compensation on the restored image information using motion vectors, and the distortion suppressing means comprises band-limiting means for band-limiting the restored image information using motion-compensated image information from the motion compensating means, and outputting the band-limited restored image information as distortion-suppressed image information, determining means for determining whether the restored image information is to be band-limited or not, based on the distortion predicting information with respect to the restored image information, and selecting means for selecting either one of the distortion-suppressed image information from the band-limiting means and the restored image information based on a determined result from the determining means. Since the restored image information is band-limited in the time domain based on distortion predicting information with respect to the restored image information, it is possible to effectively reduce distortions which vary with time without imparting a large degradation of image quality to images, and also to effectively suppress only distortions caused by image compression because of the adaptive band-limiting capability.

The motion compensating means comprises motion vector detecting means operable based on the restored image information and image information of frames preceding and following the restored image information, for detecting a first motion vector of the frame following the restored image information with respect to the restored image information, and a second motion vector of the frame preceding the restored image information with respect to the restored image information, first motion compensating means for effecting motion compensation on the frame following the restored image information with respect to the restored image information according to the first motion vector, and second motion compensating means for effecting motion compensation on the frame preceding the restored image information with respect to the restored image information according to the second motion vector. If the distortion predicting information comprises information with no distortions, then the restored image information is outputted based on a determined result from the determining means. Since the restored image information is band-limited in the time domain based on distortion predicting information with respect to the restored image information, it is possible to effectively reduce distortions which vary with time without imparting a large degradation of image quality to images, and also to effectively suppress only distortions caused by image compression because of the adaptive band-limiting capability.

The motion compensating means is connected in a stage following the image expanding means in the decoding apparatus. Since the restored image information is band-limited in the time domain based on distortion predicting information with respect to the restored image information, it is possible to effectively reduce distortions which vary with time without imparting a large degradation of image quality to images, and also to effectively suppress only distortions caused by image compression because of the adaptive band-limiting capability.

The motion vector detecting means in the motion compensating means is connected in a stage preceding the image compressing means in the encoding apparatus, and the first motion compensating means and the second motion compensating means in the motion compensating means are connected in a stage following the image expanding means in the decoding apparatus, further comprising adding means connected to the encoding means, for adding the first and second motion vectors detected by the motion vector detecting means to the compressed image information, and extracting means connected to the decoding apparatus, for extracting the added first and second motion vectors. Since the restored image information is band-limited in the time domain based on distortion predicting information with respect to the restored image information, it is possible to effectively reduce distortions which vary with time without imparting a large degradation of image quality to images, and also to effectively suppress only distortions caused by image compression because of the adaptive band-limiting capability.

The distortion predicting information with respect to the restored image information comprises at least differential information between the motion-compensated image information from the motion compensating means and the restored image information, and the determining means has comparing means for comparing a threshold based on a quantizing value in the image compressing means with the differential information and instructing the selecting means to output the distortion-suppressed image information if the differential information is smaller than the threshold. If the differential information between the motion-compensated image information and the restored image information is smaller than the threshold based on the quantizing value in the image compressing means, resulting in a large possibility that compression-induced distortions may exist, then the selecting means selects the distortion-suppressed image information. Consequently, it is possible to effectively suppress only distortions caused by image compression without imparting a large degradation of image quality to images.

The distortion predicting information with respect to the restored image information comprises at least first differential information between first motion-compensated image information from the first motion compensating means and the restored image information, and second differential information between second motion-compensated image information from the second motion compensating means and the restored image information, and the determining means has comparing means for comparing a threshold based on a quantizing value in the image compressing means with the first differential information and the second differential information, and instructing the selecting means to output the distortion-suppressed image information if the first differential information is smaller than the threshold and the second differential information is smaller than the threshold. If the first differential information between the first motion-compensated image information and the restored image information and the second differential information between the second motion-compensated image information and the restored image information are smaller than the threshold based on the quantizing value in the image compressing means, resulting in a large possibility that compression-induced distortions may exist, then the selecting means selects the distortion-suppressed image information. Consequently, it is possible to effectively suppress only distortions caused by image compression without imparting a large degradation of image quality to images.

The distortion predicting information with respect to the restored image information includes a likelihood ratio for motion vector detection, and the determining means is controlled based on the likelihood ratio. This arrangement offers the following advantages:

Even when the differential information is smaller than the threshold, if the likelihood ratio for motion vector detection is low, then the motion compensation is not effected accurately or no motion is present in the frames that precede and follow the reference frame or the restored image information. Therefore, the quality of images would tend to be degraded if the distortion-suppressed image information band-limited in the time domain were outputted by the selecting means. According to the present invention, such a drawback is avoided because the determining means is controlled to cause the selecting means to output the restored image information, rather than the distortion-suppressed image information, if the likelihood ratio for motion vector detection is high.

The distortion predicting information with respect to the restored image information includes editing information of the restored image information, and the determining means is controlled based on the editing information. This arrangement offers the following advantages:

Even when the differential information is smaller than the threshold, if the restored image information corresponds to an editing point, then the restored image information and image information in the frames that precede and follow the restored image information are not correlated to each other. Therefore, the quality of images would tend to be degraded if the distortion-suppressed image information band-limited in the time domain were outputted by the selecting means. According to the present invention, such a drawback is avoided because the determining means is controlled to cause the selecting means to output the restored image information, rather than the distortion-suppressed image information, if the restored image information corresponds to an editing point.

The distortion predicting information with respect to the restored image information includes a likelihood ratio for motion vector detection and editing information of the restored image information, and the comparing means instructs the selecting means to output the distortion-suppressed image information if the first differential information is smaller than the threshold and the second differential information is smaller than the threshold, and if the likelihood ratio for motion vector detection is high and the editing information does not comprise information indicating an editing point. If one or both of the first and second differential information is larger than the threshold, and if the likelihood ratio for motion vector detection is high or the editing information does indicates an editing point, the selecting means selects the restored image information. Only if the first differential information is smaller than the threshold and the second differential information is smaller than the threshold, the likelihood ratio for motion vector detection is high, and the editing information does not comprise information indicating an editing point, the selecting means selects the distortion-suppressed image information. Consequently, it is possible to effectively suppress only distortions caused by image compression without imparting a large degradation of image quality to images.

According to another aspect of the present invention, there is also provided a method of processing an image signal by compressing inputted image information and transmitting and storing compressed image information, and decoding the compressed image information which has been transmitted and stored so as to restore the inputted image information, the method comprising the step of adaptively band-limiting the restored image information in the time domain based on distortion predicting information with respect to the restored image information.

The method further comprises the step of suppressing distortions in the restored image information by band-limiting the restored image information in the time domain with motion-compensated image information by way of motion vectors with respect to the restored image information, based on distortion predicting information with respect to the restored image information.

The step of suppressing distortions comprises the steps of effecting motion compensation on the restored image information using motion vectors, and band-limiting the restored image information using motion-compensated image information produced in the step of effecting motion compensation, and the method further comprises the steps of determining whether the restored image information is to be band-limited or not, based on the distortion predicting information with respect to the restored image information, and selecting either one of distortion-suppressed image information produced after the restored image information is band-limited in the time domain and the restored image information based on a determined result.

The step of effecting motion compensation comprises the steps of detecting, based on the restored image information and image information of frames preceding and following the restored image information, a first motion vector of the frame following the restored image information with respect to the restored image information, and a second motion vector of the frame preceding the restored image information with respect to the restored image information, effecting first motion compensation on the frame following the restored image information with respect to the restored image information according to the first motion vector, and effecting second motion compensation on the frame preceding the restored image information with respect to the restored image information according to the second motion vector.

The step of effecting motion compensation is effected after the compressed image information is decoded.

The step of detecting first and second motion vectors is effected before the inputted image information is compressed, the first and second motion vectors are added to the compressed image information, and the first motion compensation and the second motion compensation are effected after the compressed image information is decoded.

The distortion predicting information with respect to the restored image information comprises at least differential information between the motion-compensated image information produced in the step of effecting motion compensation and the restored image information, and the step of determining comprises the steps of comparing a threshold based on a quantizing value in the step of compressing inputted image information with the differential information, and instructing outputting of the distortion-suppressed image information if the differential information is smaller than the threshold.

The distortion predicting information with respect to the restored image information comprises at least first differential information between first motion-compensated image information produced in the step of effecting first motion compensation and the restored image information, and second differential information between second motion-compensated image information produced in the step of effecting second motion compensation and the restored image information, and the step of determining comprises the steps of comparing a threshold based on a quantizing value in the step of compressing input image information with the first differential information and the second differential information, and instructing outputting of the distortion-suppressed image information if the first differential information is smaller than the threshold and the second differential information is smaller than the threshold.

The distortion predicting information with respect to the restored image information includes a likelihood ratio for motion vector detection, and the step of determining is controlled based on the likelihood ratio.

The distortion predicting information with respect to the restored image information includes editing information of the restored image information, and the step of determining is controlled based on the editing information.

The distortion predicting information with respect to the restored image information includes a likelihood ratio for motion vector detection and editing information of the restored image information, and the step of determining comprises the step of instructing outputting of the distortion-suppressed image information if the first differential information is smaller than the threshold and the second differential information is smaller than the threshold, and if the likelihood ratio for motion vector detection is high and the editing information does not comprise information indicating an editing point.

DETAILED DESCRIPTION OF THE PREFERRED EMBODIMENTS

An image signal processing system according to a first embodiment of the present invention as it is incorporated in a digital VTR based on the principles of image data compression will first be described below with reference to FIGS. 3 through 8.

Figure 1:
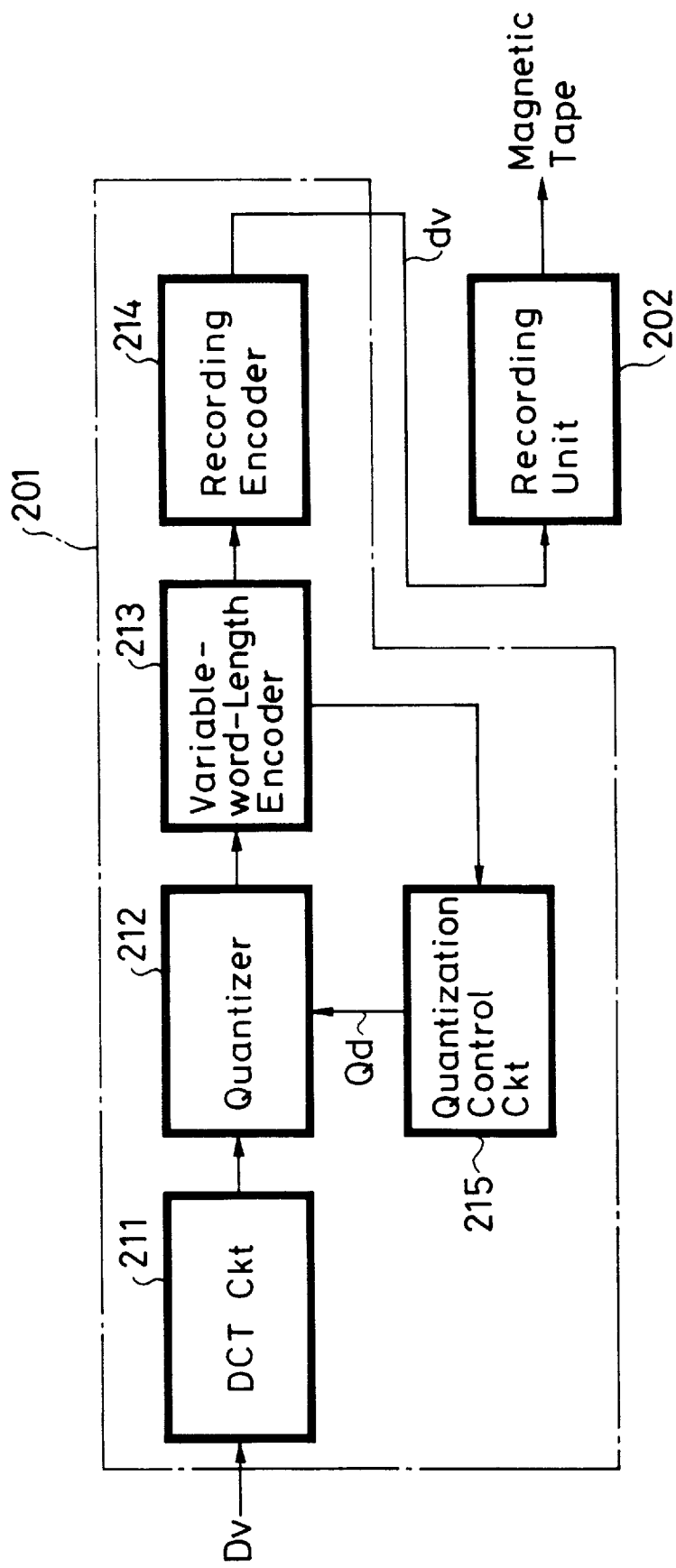
FIG. 1 is a block diagram of an encoding apparatus in a conventional image signal processing system.
Figure 2:
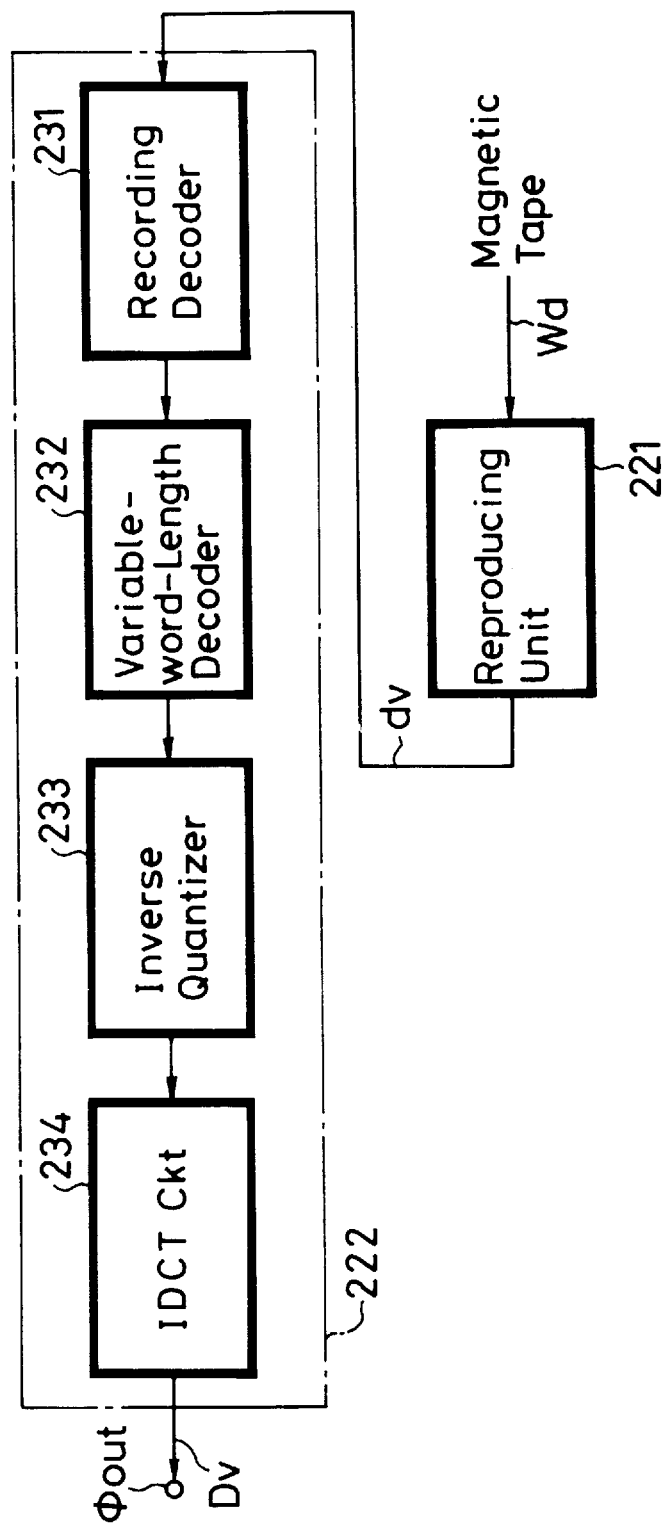
FIG. 2 is a block diagram of a decoding apparatus in the conventional image signal processing system.
Figure 3:
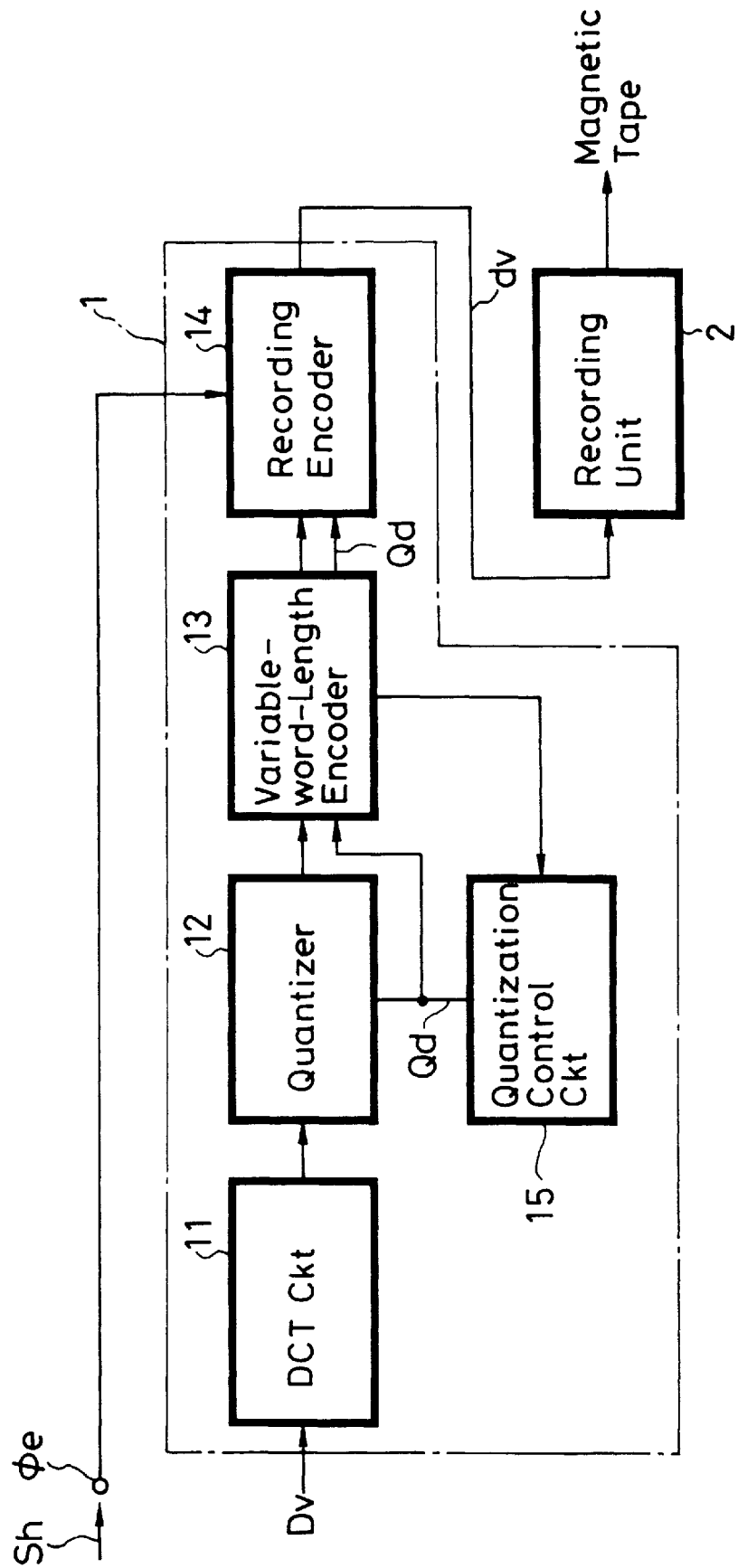
FIG. 3 is a block diagram of an encoding apparatus in an image signal processing system according to a first embodiment of the present invention as it is incorporated in a digital VTR based on the principles of image data compression.
Figure 4:
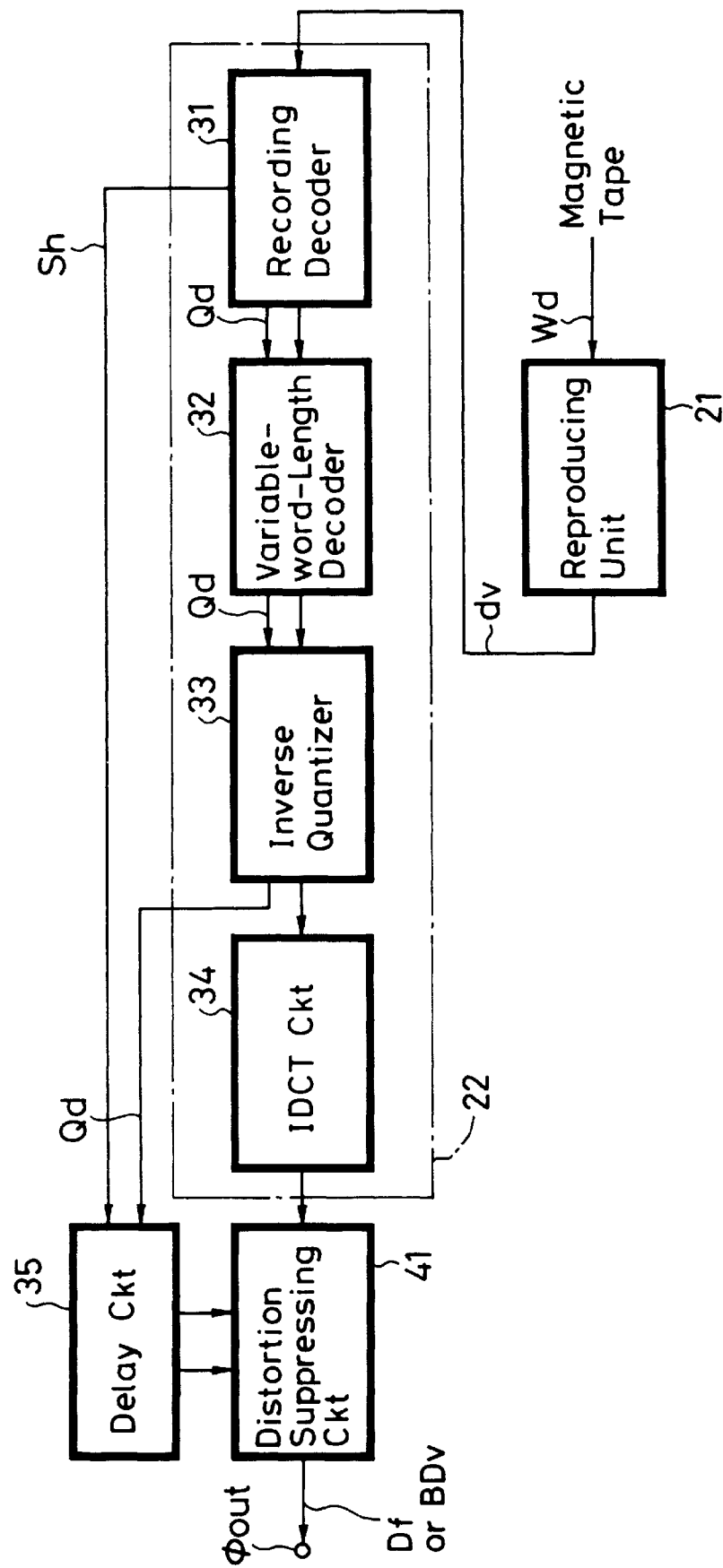
FIG. 4 is a block diagram of a decoding apparatus in the image signal processing system according to the first embodiment.

As shown in FIGS. 3 and 4, the image signal processing system according to the first embodiment comprises an encoding apparatus and a decoding apparatus.

As shown in FIG. 3, the encoding apparatus comprises a data compressing circuit 1 for compressing inputted digital component image data Dv (Y, R-Y, B-Y: which will hereinafter be referred to as "image data") and a recording unit 2 for converting compressed image data dv outputted from the data compressing circuit 1 into a signal form for being recorded on a magnetic tape and recording the compressed image data dv on the magnetic tape.

The data compressing circuit 1 has a DCT circuit 11 for subjecting the inputted image data Dv to a discrete cosine transform, a quantizer 12 for requantizing coefficient data outputted from the DCT circuit 11, a variable-word-length encoder 13 for converting a quantized level from the quantizer 12 into a variable-word-length code for data compression, and a recording encoder 14 for converting variable-word-length code data from the variable-word-length encoder 13 into a recording code.

Although not shown, the recording encoder 14 has a combining circuit for combining the variable-word-length code data from the variable-word-length encoder 13 with a quantizing value with respect to quantization and editing information Sh from an input terminal φe, and an ECC encoder for converting data from the combining circuit into blocks such that the data will be of a product code of ECCs, and adding an outer parity code and an inner parity code to the blocked data.

The editing information Sh supplied to the input terminal φe is such information which indicates that a present frame is editing points IN, OUT for ASSEMBLE and INSERT editing modes, for example. The editing information Sh is supplied as code data from a system controller, for example, when the operator operates an ASSEMBLE editing key or an INSERT editing key on a control panel.

Although not shown, the recording unit 2 comprises a channel encoder for converting the data with the added parity codes into serial data, an amplifier for amplifying the serial data outputted from the channel encoder, and a recording magnetic head for magnetically recording the amplified serial data from the amplifier on a magnetic tape based on the helical scan principles.

The encoding apparatus also has a quantization control circuit 15 for detecting a quantity of information after the DCT, receiving code quantity information from the variable-word-length encoder 13, and adjusting a quantizing parameter (a quantizing value Qd in a quantizing table) in the quantizer 12. The quantization control circuit 15 serves to adjust the quantity (code quantity) of the variable-word-length code data from the variable-word-length encoder 13.

As shown in FIG. 4, the decoding apparatus comprises a reproducing unit 21 for reproducing recorded data Wd magnetically recorded on a magnetic tape and converting the recorded data Wd into a signal form (reproduced data dv) for being decoded subsequently, and a data expanding circuit 22 for expanding (error-correcting and decoding) reproduced data dv from the reproducing unit 21 into reproduced image data Dv prior to being compressed.

Although not shown, the reproducing unit 21 comprises a playback magnetic head for reproducing the data Wd magnetically recorded on the magnetic tape as serial data, an amplifier for amplifying the serial data from the playback magnetic head, and a channel decoder for detecting the amplified serial data from the amplifier and converting the serial data into parallel data.

The data expanding circuit 22 has a recording decoder 31 for decoding the parallel data from the channel decoder in the reproducing unit 21, a variable-word-length decoder 32 for decoding variable-word-length code data from the recording decoder 31, an inverse quantizer 33 for inversely quantizing a quantized level from the variable-word-length decoder 32 into coefficient data, and an inverse discrete cosine transform (IDCT) circuit 34 for converting the coefficient data from the inverse quantizer 33 into 8×8 block data according to an inverse discrete cosine transform.

The recording decoder 31 in the data expanding circuit 22 has an ECC decoder for error-correcting the compressed image data dv based on an inner parity code and an outer parity code which have been added to the parallel data from the channel decoder in the reproducing unit 21, and dividing the error-corrected data into words of a variable-word-length code, and a detecting circuit for detecting a quantizing value Qd and editing information Sh which are included in data from the ECC decoder. The detecting circuit supplies the detected quantizing value Qd through the variable-word-length decoder 32 to the inverse quantizer 33. The detecting circuit also detects editing points (editing points IN, OUT for ASSEMBLE and INSERT editing modes) in the editing information Sh, and outputs a low-level signal (logic "0"), for example, in the period of one frame. If the detecting circuit detects no editing points, then the detecting circuit outputs a high-level signal (logic "1"). The signal outputted from the detecting circuit is delayed the period of one frame by a delay circuit 35, and then supplied to a distortion suppressing circuit 41. The delay circuit 35 serves to bring the reproduced image data Dv processed by the distortion suppressing circuit 41 into timed relationship with the various data detected by the detecting circuit.

Figure 5:
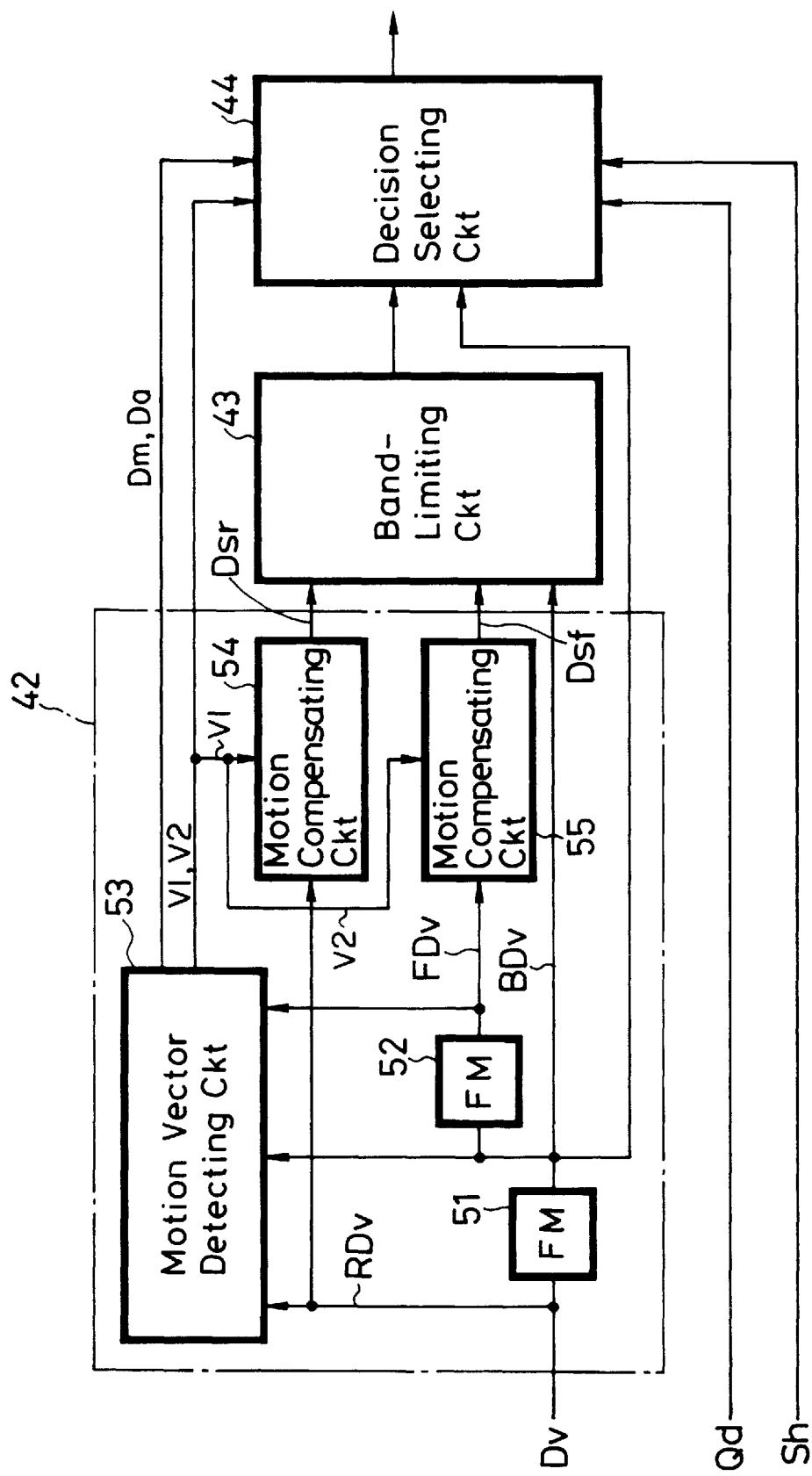
FIG. 5 is a block diagram of a distortion suppressing circuit in the image signal processing system according to the first embodiment.

In the image signal processing system according to the first embodiment, the distortion suppressing circuit 41 for suppressing encoding distortions is connected to an output terminal of the data expanding circuit 22. As shown in FIG. 5, the distortion suppressing circuit 41 comprises a motion compensating circuit 42, a band-limiting circuit (low-pass filter) 43, and a decision selecting circuit 44.

Operation of the distortion suppressing circuit 41 will briefly be described below. Using a reference frame and frames which immediately precede and follow the reference frame, the distortion suppressing circuit 41 determines respective motion vectors of the frames which immediately precede and follow the reference frame. Using these motion vectors, the distortion suppressing circuit 41 moves the frames which immediately precede and follow the reference frame into phase with the reference frame.

Using the two motion-compensated frames, the distortion suppressing circuit 41 applies a low-pass filter in the time domain to the reference frame. The distortion suppressing circuit 41 adaptively controls the degree to which the low-pass filter is applied to the reference frame, based on a quantizing value Qd upon encoding or a parameter upon vector detection.

More specifically, if the quantizing value Qd is large and DCT distortions are large, then the distortion suppressing circuit 41 applies the low-pass filter with a greater degree to the reference frame, and if the quantizing value Qd is small and DCT distortions are small, then the distortion suppressing circuit 41 applies the low-pass filter with a smaller degree to the reference frame. As described later on, if the likelihood ratio for vector detection is high, then the distortion suppressing circuit 41 applies the low-pass filter with a greater degree to the reference frame, and if the likelihood ratio for vector detection is low, then the distortion suppressing circuit 41 does not apply the low-pass filter with a greater degree to the reference frame. If the image signal processing system is incorporated in an apparatus for editing image signals, such as a VTR, for example, then the distortion suppressing circuit 41 does not apply the low-pass filter to the reference frame at editing joint points such as editing points IN, OUT for ASSEMBLE and INSERT editing modes.

Through the above processing operation of the distortion suppressing circuit 41, it is possible to prevent images from being degraded due to motion compensation prediction errors and efficiently suppress only DCT distortions.

A specific arrangement of the distortion suppressing circuit 41 for effecting the above processing operation will be described below with reference to FIG. 5.

As shown in FIG. 5, the motion compensating circuit 42 has a first frame memory 51 for holding one frame of reproduced image data Dv outputted from the data expanding circuit 22 for the period of one frame, and a second frame memory 52 for holding the reproduced image data Dv delayed by one frame and outputted from the first frame memory 51 for the period of one frame.

The first and second frame memories 51, 52 serve to convert the reproduced image data Dv from the data expanding circuit 22 into three parallel data that are one frame apart from each other. If reproduced image data BDv outputted from the first frame memory 51 are regarded as reference reproduced image data BDv, then reproduced image data outputted from the second frame memory 52 are one frame prior to the reference reproduced image data BDv (the reproduced image data outputted from the second frame memory 52 will hereinafter be referred to as "one-frame-preceding data FDv"), and reproduced image data inputted to the first frame memory 51 are one frame subsequent to the reference reproduced image data BDv (the reproduced image data inputted to the first frame memory 51 will hereinafter be referred to as "one-frame-following data RDV").

The motion compensating circuit 42 also has a motion vector detecting circuit 53 for detecting a motion vector (first motion vector) v1 of the one-frame-following data RDv with respect to the reference reproduced image data BDv from the reference reproduced image data BDv and the one-frame-following data RDv and a motion vector (second motion vector) v2 of the one-frame-preceding data FDv with respect to reference reproduced image data BDv from the reference reproduced image data BDv and the one-frame-preceding data FDv, a first motion compensating circuit 54 for moving an image represented by the one-frame-following data RDv over a distance represented by the first motion vector v1 from the motion vector detecting circuit 53 to effect motion compensation on the image with respect to the reference reproduced image data BDv, and a second motion compensating circuit 55 for moving an image represented by the one-frame-preceding data FDv over a distance represented by the second motion vector v2 from the motion vector detecting circuit 53 to effect motion compensation on the image with respect to the reference reproduced image data BDv.

Specifically, the first motion compensating circuit 54 outputs unidirectional motion compensation predicting data Dsr (hereinafter referred to as first motion compensation data) between the reference frame and the frame immediately following the reference frame, and the second motion compensating circuit 55 outputs unidirectional motion compensation predicting data Dsf (hereinafter referred to as second motion compensation data) between the reference frame and the frame immediately preceding the reference frame.

If a block matching process for matching 8×8 blocks, then the motion vector detecting circuit 53 comprises a first block matching circuit for using reference reproduced image data as a present frame and data following the frame as a reference frame, and a second block matching circuit for using reference reproduced image data as a present frame and data preceding the frame as a reference frame.

Figure 6:
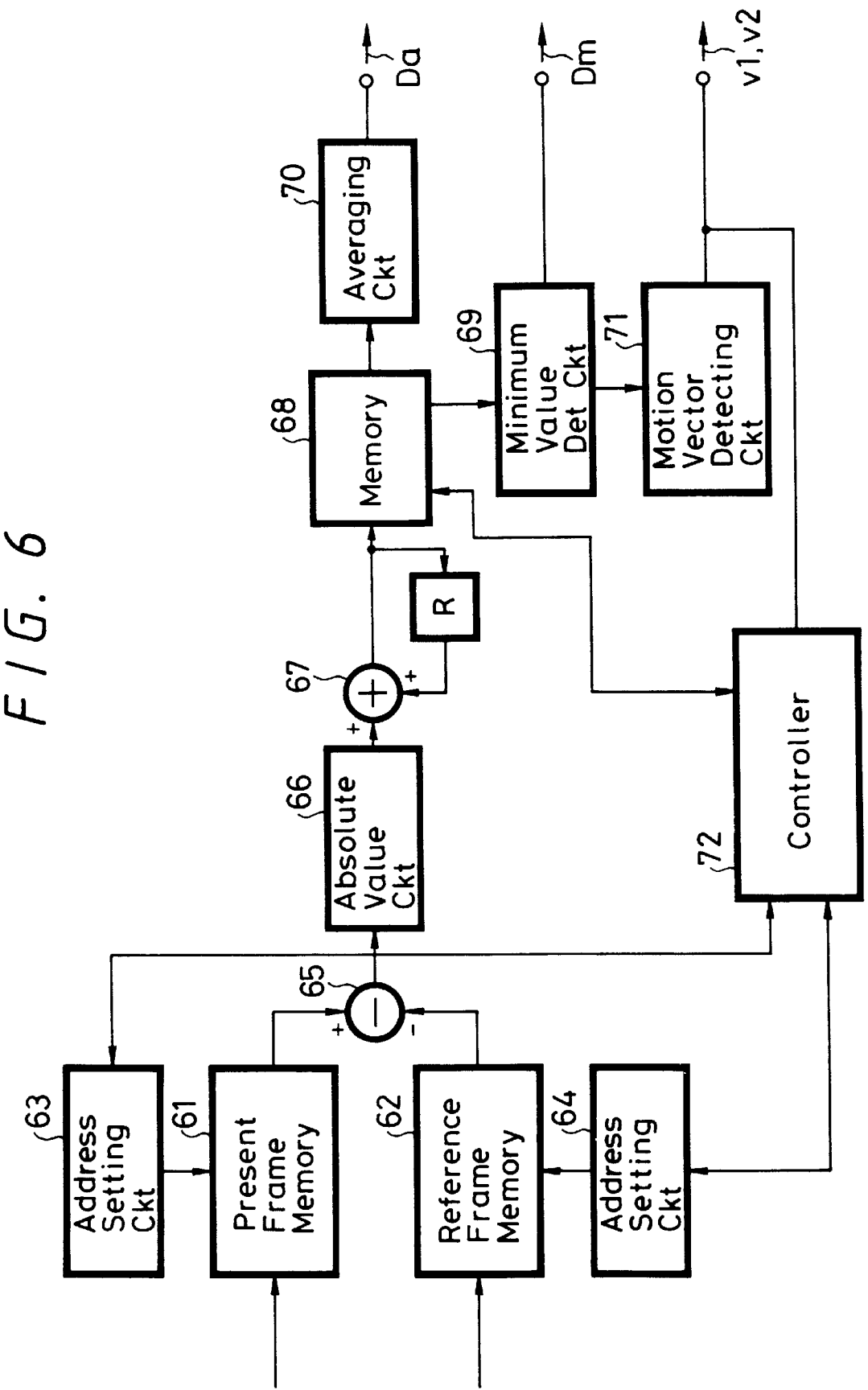
FIG. 6 is a block diagram of a block matching circuit in a motion vector detecting circuit.

As shown in FIG. 6, each of the block matching circuits comprises a present frame memory 61 for storing present frame data, a reference frame memory 62 for storing reference frame data, a present frame address setting circuit 63 for establishing addresses for reading data corresponding to blocks of interest among the data stored in the present frame memory 61, a reference frame address setting circuit 64 for establishing addresses for successively reading block data for effecting matching calculations among the data stored in the reference frame memory 62, a subtractor 65 for determining a difference, pixel by pixel, between the block data of interest read from the present frame memory 61 and the block data read from the reference frame memory 62, an absolute value circuit 66 for determining an absolute value of the differential data from the subtractor 65, an adder 67 for adding as many differential data absolute values outputted from the absolute value circuit 66 as the number of pixels represented by blocks of interest, a memory 68 for storing the sum data of differential data absolute values in each of the blocks outputted from the adder 67, a minimum value detecting circuit 69 for detecting minimum sum data of differential data absolute values among the group of sum data of differential data absolute values in the blocks stored in the memory 68, an averaging circuit 70 for determining an average value of the group of sum data of differential data absolute values, a motion vector detecting circuit 71 for calculating motion vector data from index data that are produced when the index of detecting calculations in the minimum value detecting circuit 69 is updated and minimum sum data of differential data absolute values are detected, and a controller 72 for controlling various circuits of the block matching circuit.

In each of the block matching circuits, the motion vector detecting circuit 71 outputs first and second motion vector data v1, v2, the minimum value detecting circuit 69 outputs minimum value data Dm, and the averaging circuit 70 outputs average value data Da. The first and second motion vector data v1, v2 are supplied respectively to the first and second motion compensating circuits 54, 55 for a motion compensating process, and also supplied to a vector likelihood ratio determining circuit 97 (see FIG. 7) in the decision selecting circuit 44. The vector likelihood ratio determining circuit 97 is also supplied with the minimum value data Dm and the average value data Da which are detected vector information.

Figure 7:
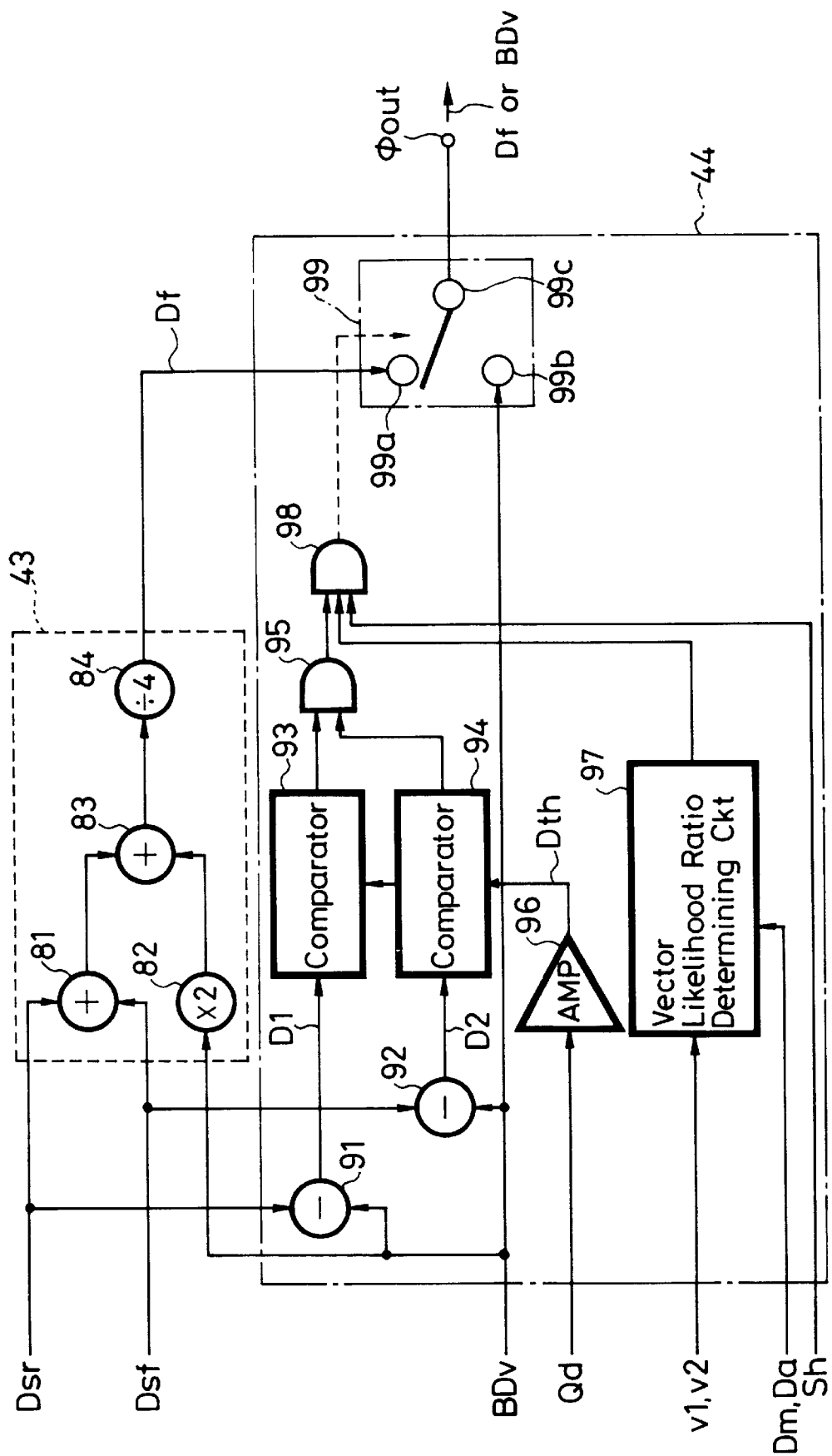
FIG. 7 is a block diagram of a band limiting circuit and a decision selecting circuit in the distortion suppressing circuit.

As shown in FIG. 7, the band-limiting circuit 43 has a first adder 81 for adding the first motion-compensated data Dsr from the first motion compensating circuit 54 and the second motion-compensated data Dsf from the second motion compensating circuit 55, a multiplier 82 for doubling the reproduced image data BDv from the first frame memory 51, a second adder 83 for adding sum data from the first adder 81 and product data from the multiplier 82, and a divider 84 for reducing sum data from the second adder 83 to ¼.

As shown in FIG. 7, the decision selecting circuit 44 has a first subtractor 91 for subtracting one of the reproduced image data BDv and the first motion- compensated data Dsr from the other to output the difference as first differential data D1, a second subtractor 92 for subtracting one of the reproduced image data BDv and the second motion-compensated data Dsf from the other to output the difference as second differential data D2, a first comparator 93 for comparing the first differential data D1 from the first subtractor 91 with threshold data Dth, a second comparator 94 for comparing the second differential data D2 from the second subtractor 92 with the threshold data Dth, a two-input AND gate (first AND gate) 95 for ANDing comparison result signals from the first and second comparators 93, 94, an amplifier 96 for being supplied with the quantizing value Qd from the inverse quantizer 33, multiplying the quantizing value Qd by a suitable gain, and outputting the product as the threshold data Dth, a vector likelihood ratio determining circuit 97 for determining whether motion compensation is being carried out accurately or not, based on distribution information of the sum data of differential data absolute values and the magnitude of motion vector data which are produced by block matching in the motion vector detecting circuit 53, and a three-input AND gate (second AND gate) 98 for ANDing an output signal from the first AND gate 95, a likelihood ratio decision signal from the vector likelihood ratio determining circuit 97, and a detected editing point signal from the detecting circuit in the recording decoder 31.

The first and second comparators 93, 94 compare the respective differential data D1, D2 with the threshold data Dth, and output a high-level signal (logic "1") when the values of the differential data D1, D2 are smaller than the threshold data Dth.

The vector likelihood ratio determining circuit 97 is supplied with detected vector information, i.e., the minimum value data Dm from the minimum value detecting circuit 69 and the average value data Da from the averaging circuit 70, as well as the motion vector data v1, v2 from the respective block matching circuits in the motion vector detecting circuit 53. The vector likelihood ratio determining circuit 97 operates as follows: If the motion vector data are (x, y)=(0±α, 0±α), the vector likelihood ratio determining circuit 97 determines that the accuracy of motion compensation is poor, and outputs a low-level signal (logic "0"). Even if the motion vector data are (x, y)=(x>±α, y>±α), when the absolute value of the differential data: the average value–the minimum value is smaller than β, the vector likelihood ratio determining circuit 97 determines that the accuracy of motion compensation is poor, and outputs a low-level signal (logic "0"). If the motion vector data are (x, y)=(x>±α, y>±α), then when the absolute value of the differential data: the average value the minimum value is equal to or greater than β, the vector likelihood ratio determining circuit 97 determines that the accuracy of motion compensation is good, and outputs a high-level signal (logic "1").

The decision selecting circuit 44 also has a switching circuit 99 connected to an output terminal of the AND gate 98. The switching circuit 99 has a first fixed contact 99a connected to an output terminal of the band-limiting circuit 43, a second fixed contact 99b connected to an output terminal of the first frame memory 51, and a movable contact 99c connected to an output terminal φout of the decision selecting circuit 44, i.e., the output terminal of the distortion suppressing circuit 41. When the output signal from the second AND gate 98 is of a high level (logic "1"), the movable contact 99c is connected to the first fixed contact 99a, allowing band-limited data (distortion-suppressed data) Df from the band-limiting circuit 43 to be outputted from the output terminal φout. When the output signal from the second AND gate 98 is of a low level (logic "0"), the movable contact 99c is connected to the second fixed contact 99b, allowing the reference reproduced image data BDv from the first frame memory 51 to be outputted from the output terminal φout.

Operation of the image signal processing system according to the first embodiment will be described below.

In the encoding apparatus, inputted image data Dv are compressed by the data compressing circuit 1, and compressed image data dv are outputted from the recording unit 2 and recorded on a magnetic tape. A quantizing value Qd adjusted by the quantization control circuit 15 and editing information Sh from the input terminal φe are combined with the compressed image data dv by the combining circuit in the recording encoder 14, and outputted from the recording unit 2 at the time the recording magnetic head in the recording unit 2 traces an auxiliary track or an auxiliary space in a video track on the magnetic tape. Therefore, the quantizing value Qd and the editing information Sh are recorded in the auxiliary track or the auxiliary space on the magnetic tape.

In the decoding apparatus, the compressed image data recorded on the magnetic tape are successively reproduced by the reproducing unit 21, and expanded by the data expanding circuit 22, and reproduced image data Dv are outputted from the IDCT circuit 34 to the distortion suppressing circuit 41.

It is assumed that the first frame memory 51 in the distortion suppressing circuit 41 outputs reproduced image data BDv relative to a j frame, the second frame memory 52 in the distortion suppressing circuit 41 outputs reproduced image data FDv relative to a (j−1) frame, and the IDCT circuit 34 outputs reproduced image data RDv relative to a (j+1) frame. These reproduced image data FDv, BDv, RDv relative to the respective (j−1), j, and (j+1) frames are supplied to the motion vector detecting circuit 53, which detects motion vectors v1, v2 with respect to the reproduced image data BDv relative to the j frame which serves as reference reproduced image data. Specifically, a first motion vector v1 of the (j+1) frame with respect to the j frame is detected according to a block matching process in which the j frame is regarded as a present frame and the (j+1) as a reference frame, and a second motion vector v2 of the (j−1) frame with respect to the j frame is detected according to a block matching process in which the j frame is regarded as a present frame and the (j−1) as a reference frame.

The first motion compensating circuit 54 moves the reproduced image data RDv of the (j+1) frame over a distance represented by the first motion vector v1 and outputs the moved reproduced image data as first motion-compensated data Dsr, and the second motion compensating circuit 55 moves the reproduced image data FDv of the (j−1)

frame over a distance represented by the second motion vector v2 and outputs the moved reproduced image data as second motion-compensated data Dsf.

The first and second motion-compensated data Dsr, Dsf from the respective first and second motion compensating circuits 54, 55 are supplied to the band-limiting circuit 43. The band-limiting circuit 43 applies a low-pass filter of 1 : 2 : 1 to the reproduced image data BDv relative to the j frame.

In the decision selecting circuit 44, the first subtractor 91 calculates the difference, pixel by pixel, between the reproduced image data BDv relative to the j frame and the first motion-compensated data Dsr and outputs first differential data D1, and the second subtractor 92 calculates the difference, pixel by pixel, between the reproduced image data BDv relative to the j frame and the second motion-compensated data Dsf and outputs second differential data D2. The first and second differential data D1, D2 are then supplied to the corresponding first and second comparators 93, 94, and compared thereby with the threshold data Dth supplied from the amplifier 96.

When the values of both the first and second differential data D1, D2 are smaller than the threshold value Dth, the first and second comparators 93, 94 output a high-level signal (logic "1"). When output signals from both the first and second comparators 93, 94 are of logic "1", the first AND gate 95 outputs a high-level signal (logic "1") to the second AND gate 98.

When an output signal from the second AND gate 98 is of a high level (logic "1"), the movable contact 99c of the switching circuit 99 is connected to the first fixed contact 99a, allowing band-limited data Df from the band-limiting circuit 43 to be outputted from the output terminal φout of the distortion suppressing circuit 41. When the output signal from the second AND gate 98 is of a low level (logic "0"), the movable contact 99c is connected to the second fixed contact 99b, allowing the reproduced image data (data with distortions not suppressed) BDv from the first frame memory 51 to be outputted from the output terminal φout.

If the likelihood ratio of vector detection is high, then the vector likelihood ratio determining circuit 97 outputs a high-level signal (logic "1"), and if the likelihood ratio of vector detection is low, then the vector likelihood ratio determining circuit 97 outputs a low-level signal (logic "0"). The output signal from the vector likelihood ratio determining circuit 97 controls an output signal from the second AND gate 98.

If the content of the editing information Sh detected by the detecting circuit in the recording decoder 31 represents an editing point, then the detecting circuit outputs a low-level signal (logic "0"), and if the content of the editing information Sh detected by the detecting circuit in the recording decoder 81 does not represent an editing point, then the detecting circuit outputs a high-level signal (logic "1"). The output signal from the detecting circuit also controls an output signal from the second AND gate 98.

The above operation is summarized as follows: Only when the difference between pixels of a reference frame and pixels of a preceding frame is small and the difference between pixels of a reference frame and pixels of a following frame is small, indicating that the possibility of compression-generated distortions is high, the distortion suppressing circuit 41 applies a low-pass filter and outputs band-limited distortion-suppressed data Df from the output terminal φout. When either one of the differences is large, the distortion suppressing circuit 41 does not apply a low-pass filter and outputs the reproduced image data BDv as they are.

Whether the differences are large or not is determined using the quantizing value Qd as a decision reference in this embodiment. Specifically, if the quantizing value Qd is large and it is predicted that compression-generated distortions will be large, then the decision reference (threshold) Dth is increased, and if the quantizing value Qd is small and it is predicted that compression-generated distortions will be small, then the decision reference (threshold) Dth is reduced.

By thus varying the decision reference depending on the quantizing value Qd, it is possible to apply a low-pass filter only to compression-generated distortions.

With respect to the likelihood ratio of motion vector detection, in the case where block matching is employed for motion vector detection as with the present embodiment, the vector likelihood ratio determining circuit 97 determines whether motion compensation is carried out with accuracy, based on distribution information of the sum data of absolute values of image pixel differences between frames and the magnitude of motion vector data, produced when block matching is effected.

If a low-pass filter were applied to an image where only the luminance varies between frames, then it would impair information of the image. With such an image, the distribution of the sum data of differential data absolute values upon vector detection is flat. The vector likelihood ratio determining circuit 97 detects such distribution information, and a low-pass filter is not applied when either one of the differences described above is large.

With respect to an editing process, images across an editing point lack correlation in the time domain, and hence it cannot be expected that distortions can be suppressed by applying a low-pass filter to the image data. Therefore, no low-pass filter is applied to the image data across an editing point. This operation is realized by supplying the editing information Sh from the detecting circuit in the recording decoder 31 to the second AND gate 98.

Figure 8:
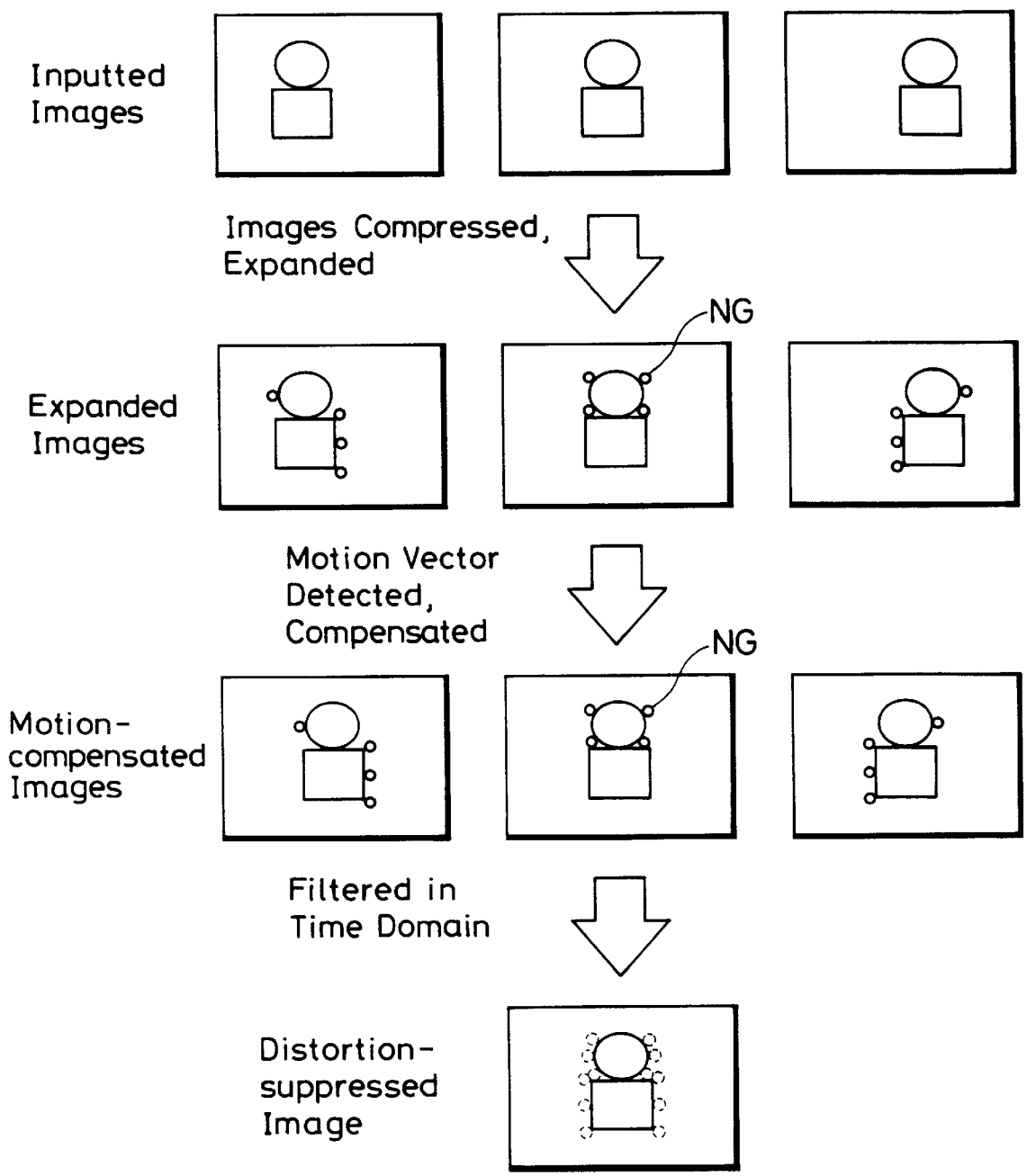
FIG. 8 is a diagram illustrating the manner in which an image distortion is varied by the image signal processing system according to the first embodiment.

The manner in which an image distortion is varied by the signal processing by the image signal processing system according to the first embodiment will be described below with reference to FIG. 8.

It is assumed that inputted images represent an object which exists at the center of the screen and is moving to the right. When these images are compressed and then expanded, DCT distortions which vary with time appear in the images. The DCT distortions are caused so as to vary with time with respect to the images because the phase of the images varies with respect to the base of DCT, and are generally called mosquito noise. The distortions which vary with time with respect to the images are more conspicuous than fixed distortions, and are responsible for a large degradation of image quality which occurs when moving images are compressed.

Motion vectors of the images which precede and follow the central image are detected and compensated to fix the object at the center of the screen, thus producing motion-compensated images. A low-pass filter is applied to the three motion-compensated images, thereby producing a distortion-suppressed image. The application of the low-pass filter attenuates the DCT distortions which vary with time appear with respect to the images.

Since the original image has been motion-compensated, it has only low-frequency components in the time domain, and is not subjected to large distortions even by the application of the low-pass filter.

With the image signal processing system according to the first embodiment, therefore, it is possible to effectively reduce distortions which vary with time without imparting a large degradation of image quality to images, for effectively suppressing only distortions caused by image compression.

Figure 9:
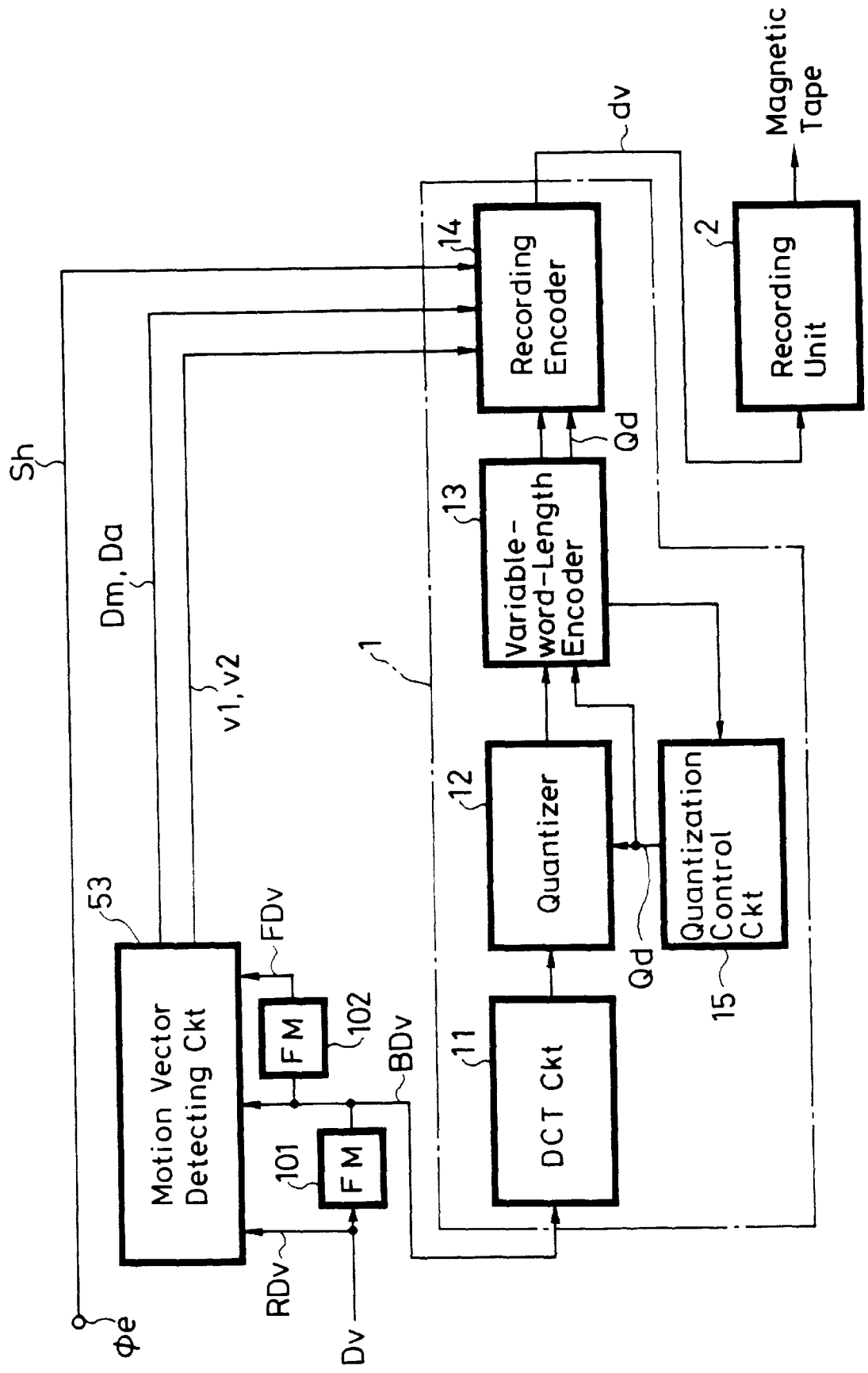
FIG. 9 is a block diagram of an encoding apparatus in an image signal processing system according to a second embodiment of the present invention as it is incorporated in a digital VTR based on the principles of image data compression.

An image signal processing system according to a second embodiment of the present invention as it is incorporated in a digital VTR based on the principles of image data compression will first be described below with reference to FIGS. 9 through 11. Those parts of the image signal processing system according to the second embodiment shown in FIGS. 9 through 11 which are identical to those of the image signal processing system according to the first embodiment shown in FIGS. 3 through 5 are denoted by identical reference numerals.

The image signal processing system according to the second embodiment is essentially the same as the image signal processing system according to the first embodiment, but differs therefrom in that the motion vector detecting circuit 53 is connected in a stage preceding the encoding apparatus.

Specifically, a first frame memory 101 for holding one frame of inputted image data Dv for the period of one frame, a second frame memory 102 for holding reference image data BDv delayed by one frame and outputted from the first frame memory 101 further for the period of one frame, and a motion vector detecting circuit 53 for detecting a first motion vector v1 from the reference image data BDv and one-frame-following data RDv from the second frame memory 102 and a second motion vector v2 from the reference image data BDv and one-frame-preceding data FDv from the first frame memory 101 are connected in a stage preceding the data compressing circuit 1.

The reference image data BDv from the first frame memory 101 are inputted to the data compressing circuit 1.

The data compressing circuit 1 includes a recording encoder 14 which has a combining circuit for combining the variable-word-length code data from the variable-word-length encoder 13 with motion vector data v1, v2 from the 41 motion vector detecting circuit 53, detected vector information (minimum value data Dm and average value data Da), editing information Sh from an input terminal φe, and a quantizing value Qd supplied from the quantization control circuit 15 through the variable-word-length encoder 13. Therefore, the motion vector data (v1 and v2), the detected vector information (minimum value data Dm and average value data Da), the editing information Sh, and the quantizing value Qd are recorded on an auxiliary track or an auxiliary space on a magnetic tape.

Figure 10:
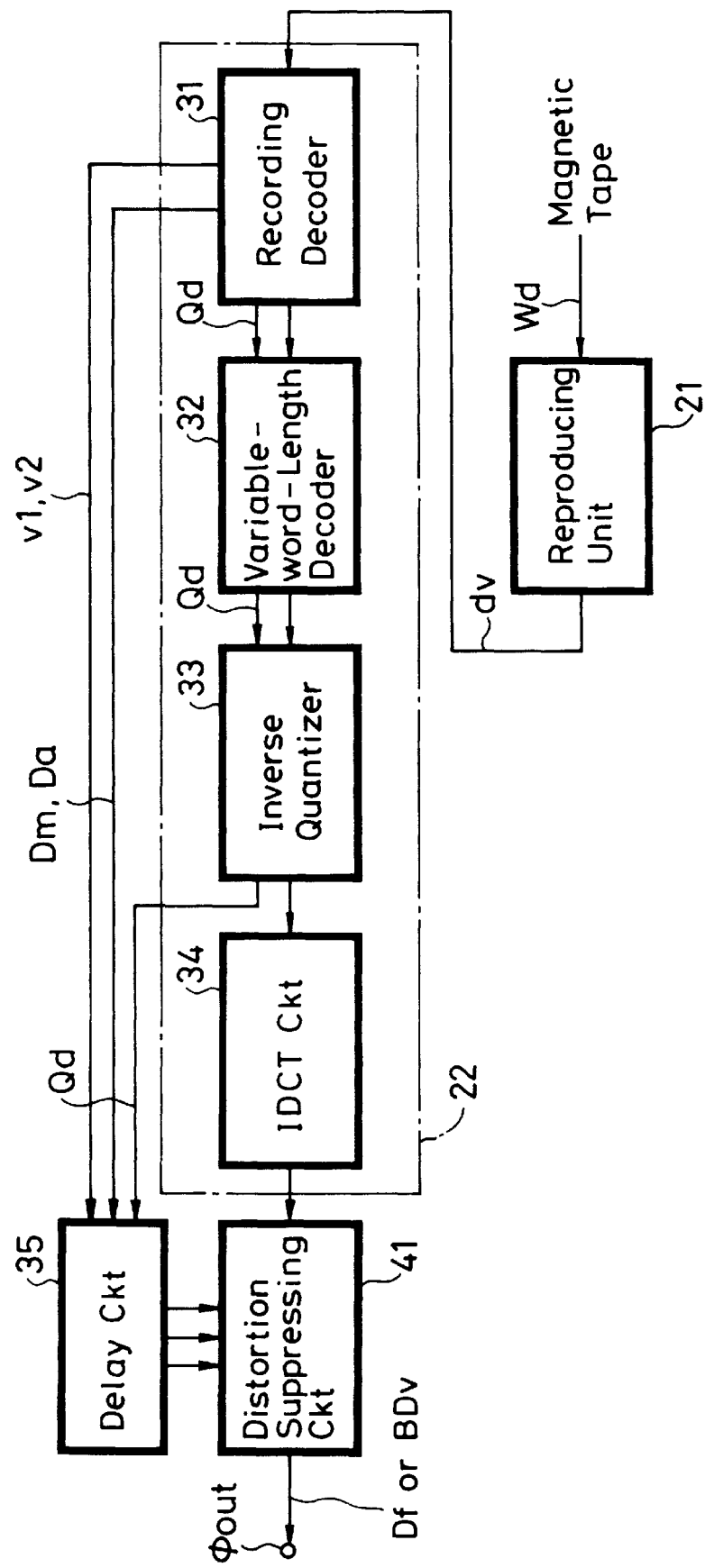
FIG. 10 is a block diagram of a decoding apparatus in an image signal processing system according to the second embodiment.
Figure 11:
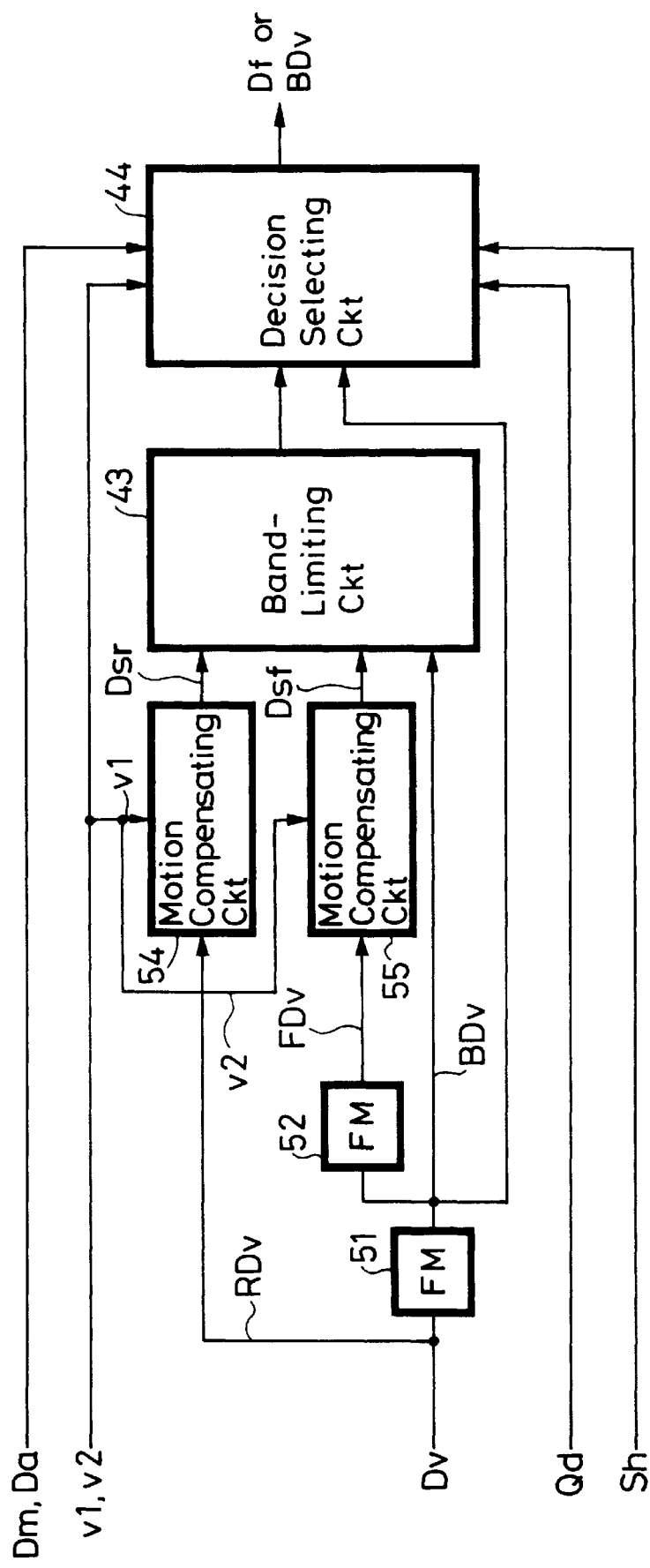
FIG. 11 is a block diagram of a distortion suppressing circuit in the image signal processing system according to the second embodiment.

As shown in FIG. 10, a decoding apparatus according to the second embodiment is of substantially the same arrangement as the decoding apparatus according to the first embodiment shown in FIG. 4, but differs therefrom in that the detecting circuit in the recording decoder 31 detects the quantizing value Qd, the detected vector information (minimum value data Dm and average value data Da), and the motion vector data (v1, v2), and these detected data are supplied to the distortion suppressing circuit 41 through the delay circuit 35, and that the distortion suppressing circuit 41 is devoid of the motion vector detecting circuit 53 as shown in FIG. 11.

Structural details of the distortion suppressing circuit 41 will be described below. The distortion suppressing circuit 41 has a first frame memory 51 for holding one frame of reproduced image data (one-frame-following data) RDv outputted from the data expanding circuit 22 for the period of one frame, a second frame memory 52 for holding the reproduced image data (reference reproduced image data) BDv delayed by one frame and outputted from the first frame memory 51 further for the period of one frame, a first motion compensating circuit 54 for effecting motion compensation on the one-frame-following data RDv from the data expanding circuit 22 based on the motion vector data v1 detected by the detecting circuit in the recording decoder 31, a second motion compensating circuit 55 for effecting motion compensation on the one-frame-preceding data FDv from the second frame memory 52 based on the motion vector data v2 detected by the detecting circuit, a band-limiting circuit 43 and a decision selecting circuit 44 which are identical to those according to the first embodiment.

The detecting circuit in the recording decoder 31 detects the quantizing value Qd, the editing information Sh, the motion vector data (v1, v2), and the detected vector information (Dm, Da). The quantizing value Qd, the editing information Sh, the motion vector data (v1, v2), and the detected vector information (Dm, Da) which are detected by the detecting circuit are supplied to the distortion suppressing circuit 41 through the delay circuit 35.

Operation of the image signal processing system according to the second embodiment will be described below.

In the encoding apparatus, motion vectors v1, v2 are detected from inputted image data Dv by the motion vector detecting circuit 53, image data BDv outputted from the first frame memory 101 are compressed by the data compressing circuit 1, and compressed image data dv are outputted from the recording unit 2 and recorded on a magnetic tape. A quantizing value Qd adjusted by the quantization control circuit 15, editing information Sh from the input terminal φe, and the motion vector data (v1, v2) from the motion vector detecting circuit 53 are combined with the compressed image data dv by the combining circuit in the recording encoder 14, and outputted from the recording unit 2 at the time the recording magnetic head in the recording unit 2 traces an auxiliary track or an auxiliary space in a video track on the magnetic tape. Therefore, the quantizing value Qd and the editing information Sh are recorded in the auxiliary track or the auxiliary space on the magnetic tape.

It is assumed that image data BDv relative to a j frame are inputted to the DCT circuit 11, image data FDv relative to a (j−1) frame are outputted from the second frame memory 102, and image data RDv relative to a (j+1) frame are inputted to the first frame memory 101. These reproduced image data FDv, BDv, RDv relative to the respective (j−1), j, and (j+1) frames are supplied to the motion vector detecting circuit 53, which detects motion vectors v1, v2 with respect to the reproduced image data BDv relative to the j frame which serves as reference reproduced image data.

The first and second motion vector data v1, v2 and the detected vector information (average value data Da and minimum value data Dm) which are detected by the motion vector detecting circuit 53 are supplied to the combining circuit in the recording encoder 14, and recorded together with the compressed image data dv relative to the j frame on the magnetic tape.

In the decoding apparatus, the compressed image data recorded on the magnetic tape are successively reproduced by the reproducing unit 21, and expanded by the data expanding circuit 22, and reproduced image data Dv are outputted from the IDCT circuit 34 to the distortion suppressing circuit 41.

It is assumed that the first frame memory 51 in the distortion suppressing circuit 41 outputs image data BDv relative to a j frame, the second frame memory 52 in the distortion suppressing circuit 41 outputs reproduced image data FDv relative to a (j−1) frame, and the IDCT circuit 34 outputs reproduced image data RDv relative to a (j+1) frame. The reproduced image data RDv, FDv relative to the respective (j+1), and (j−1) frames are supplied respectively to the first and second motion compensating circuits 54, 55.

The first motion compensating circuit 54 moves the reproduced image data RDv of the (j+1) frame over a distance represented by the first motion vector v1 detected by the detecting circuit and outputs the moved reproduced image data as first motion-compensated data Dsr, and the second motion compensating circuit 55 moves the reproduced image data FDv of the (j−1) frame over a distance represented by the second motion vector v2 detected by the detecting circuit and outputs the moved reproduced image data as second motion-compensated data Dsf.

The first and second motion-compensated data Dsr, Dsf from the respective first and second motion compensating circuits 54, 55, and the reproduced image data BDv from the first frame memory 51 are supplied to the band-limiting circuit 43. The band-limiting circuit 43 applies a low-pass filter of 1 : 2 : 1 to the reproduced image data BDv relative to the j frame.

In the decision selecting circuit 44, the first subtractor 91 calculates the difference, pixel by pixel, between the reproduced image data BDv relative to the j frame and the first motion-compensated data Dsr and outputs first differential data D1, and the second subtractor 92 calculates the difference, pixel by pixel, between the reproduced image data BDv relative to the j frame and the second motion-compensated data Dsf and outputs second differential data D2. The first and second differential data D1, D2 are then supplied to the corresponding first and second comparators 93, 94, and compared thereby with the threshold data Dth supplied from the amplifier 96.

When the values of both the first and second differential data D1, D2 are smaller than the threshold value Dth, the first and second comparators 93, 94 output a high-level signal (logic "1"). When output signals from both the first and second comparators 93, 94 are of logic "1", the first AND gate 95 outputs a high-level signal (logic "1") to the second AND gate 98.

When an output signal from the second AND gate 98 is of a high level (logic "1"), the movable contact 99c of the switching circuit 99 is connected to the first fixed contact 99a, allowing band-limited data Df from the band-limiting circuit 43 to be outputted from the output terminal φout of the distortion suppressing circuit 41. When the output signal from the second AND gate 98 is of a low level (logic "0"), the movable contact 99c is connected to the second fixed contact 99b, allowing the reproduced image data (data with distortions not suppressed) BDv from the first frame memory 51 to be outputted from the output terminal φout.

If the likelihood ratio of vector detection is high, then the vector likelihood ratio determining circuit 97 outputs a high-level signal (logic "1"), and if the likelihood ratio of vector detection is low, then the vector likelihood ratio determining circuit 97 outputs a low-level signal (logic "0"). The output signal from the vector likelihood ratio determining circuit 97 controls an output signal from the second AND gate 98.

If the content of the editing information Sh detected by the detecting circuit in the recording decoder 31 represents an editing point, then the detecting circuit outputs a low-level signal (logic "0"), and if the content of the editing information Sh detected by the detecting circuit in the recording decoder 81 does not represent an editing point, then the detecting circuit outputs a high-level signal (logic "1"). The output signal from the detecting circuit also controls an output signal from the second AND gate 98.

As with the image signal processing system according to the first embodiment, the image signal processing system according to the second embodiment makes it possible to effectively reduce distortions which vary with time without imparting a large degradation of image quality to images, for effectively suppressing only distortions caused by image compression.

The image signal processing systems according to the first and second embodiments are incorporated in the digital VTR in which the compressed image data dv generated by the encoding apparatus are recorded on the magnetic tape, and the recorded compressed image data dv are reproduced and restored to the original image data Dv by the decoding apparatus. However, the image signal processing systems may be incorporated in a data communication apparatus which transmits the compressed image data dv through a communication path such as an optical fiber or the like and restores the transmitted compressed image data dv to the original image data Dv.

In such a modification, transform parameters of the encoding process of an ECC encoder which effects a recording encoding process and the decoding process of an EC decoder which effects a recording decoding process may be produced according to the characteristics of the communication path.

The image signal processing systems according to the first and second embodiments may be employed to record compressed image data dv on and reproduce compressed image data dv from a recordable magnetooptical disk, for example, which is a disk-shaped recording medium.

In such a modification, either a magnetic modulating system or an optical modulating system may be employed. If the magnetic modulating system is employed, then a magnetic field generating means (energizing coil) for generating an external magnetic field depending on the logic value of the compressed image data dv and a laser beam applying means (optical pickup) for heating a recording layer (perpendicularly magnetized film) of a magnetooptical disk up to the Curie point or a higher temperature may be used as the recording magnetic head in the recording unit 2, and the optical pickup may double as the playback magnetic head in the reproducing unit 21.

If the optical modulating system is employed, then an energizing coil for generating a constant external magnetic field and a laser beam applying means (optical pickup) for selectively heating a recording layer (perpendicularly magnetized film) of a magnetooptical disk up to the Curie point or a higher temperature depending on the logic value of the compressed image data dv may be used instead of the recording magnetic head, and the optical pickup may double as the playback magnetic head.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A system for reducing visual distortion during decoding of image information, comprising:

decoding apparatus including image expanding means for decoding received compressed image information, that has been compressed with a quantizing value, to obtain restored image information related to said image information, said decoding apparatus including motion compensating means for effecting motion compensation on the restored image information using motion vectors; and a distortion suppressing circuit, connected to said decoding apparatus, for receiving the restored image information therefrom and for generating first information comprising at least differential information between motion-compensated image information and the restored image information, said distortion suppressing circuit performing a comparison operation between said differential information and a threshold value set in accordance with said quantizing value such that, based on said comparison operation, said distortion suppressing circuit selectively either adaptively band-limits in time domain the restored image information prior to outputting the restored image information or passes the restored image information unmodified for selectively providing either the band-limited restored image information or the unmodified restored image information, respectively, as output image information related to said image information.

2. A system according to claim 1, wherein said distortion suppressing circuit comprises:

band-limiting means for band-limiting the restored image information using said motion-compensated image information from said motion compensating circuit, and outputting the band-limited restored image information as distortion-suppressed image information;

determining means for determining whether the restored image information is to be band-limited or not, based on said first information with respect to the restored image information; and selecting means for selecting either one of the distortion-suppressed image information from said band-limiting means and the restored image information based on a result from said determining means.

3. A system according to claim 2, wherein said motion compensating means comprises:

motion vector detecting means operable based on the restored image information and image information of frames preceding and following the restored image information, for detecting a first motion vector of the frame following the restored image information with respect to the restored image information, and a second motion vector of the frame preceding the restored image information with respect to the restored image information;

first motion compensating means for effecting motion compensation on the frame following the restored image information with respect to the restored image information according to said first motion vector; and second motion compensating means for effecting motion compensation on the frame preceding the restored image information with respect to the restored image information according to said second motion vector.

4. A system according to claim 2, wherein said motion compensating means is connected in a stage following said image expanding means in said decoding apparatus.

5. A system according to claim 2, wherein said determining means has comparing means for comparing said threshold value with said differential information, and instructing said selecting means to output the distortion-suppressed image information if said differential information is smaller than said threshold value.

6. A system according to claim 3, further comprising encoding apparatus including image compressing means for compressing said image information, and including means for transmitting the compressed image information from said encoding apparatus.

7. A system according to claim 5 wherein said first information includes a likelihood ratio for motion vector detection, and said determining means is operative on a basis of said likelihood ratio.

8. A system according to claim 5 wherein said first information includes editing information of the restored image information, and said determining means is operative on a basis of said editing information.

9. A system according to claim 6, wherein said motion vector detecting means is connected in a stage preceding said image compressing means, and said first and second motion compensating means are connected in a stage following said image expanding means in said decoding apparatus, said system further comprising adding means connected to said encoding apparatus for adding the first and second motion vectors to the compressed image information, and extracting means connected to said decoding apparatus for extracting the added first and second motion vectors.

10. A system according to claim 9, wherein said first information comprises at least first differential information between first motion-compensated image information from said first motion compensating means and the restored image information, and comprises second differential information between second motion-compensated image information from said second motion compensating means and the restored image information, and said determining means has comparing means for comparing a threshold based on said quantizing value with said first differential information and said second differential information, and instructing said selecting means to output said distortion-suppressed image information if said first differential information is smaller than said threshold and said second differential information is smaller than said threshold.

11. A system according to claim 10, wherein said first information includes a likelihood ratio for motion vector detection and editing information of the restored image information, and said comparing means instructs said selecting means to output said distortion-suppressed image information if said first differential information is smaller than said threshold and said second differential information is smaller than said threshold, and if said likelihood ratio for motion vector detection is high and said editing information does not include information indicating an editing point.

12. A method for reducing visual distortion during decoding of image information, said method comprising the steps of:

decoding received compressed image information, that has been compressed with a quantizing value, by using image expansion to obtain restored image information related to said image information, said decoding step including motion compensating the restored image information using motion vectors; and suppressing image distortion by receiving the restored image information and generating first information comprising at least differential information between motion-compensated image information and the restored image information, said suppressing step including performing a comparison operation between said differential information and a threshold value set in accordance with said quantizing value such that based on said comparison operation the restored image information is selectively either adaptively band-limited prior to outputting the restored image information or passed unmodified to selectively provide either the band-limited restored image information or the unmodified restored image information, respectively, as output image information related to said image information.

13. A method according to claim 12, further comprising suppressing distortions in the restored image information by band-limiting the restored image information in the time domain with motion-compensated image information by way of motion vectors with respect to the restored image information, based on said first information.

14. A method according to claim 13, wherein said step of suppressing distortions comprises effecting motion compensation on the restored image information using motion vectors, and band-limiting the restored image information using motion-compensated image information produced in said step of effecting motion compensation, and further comprising the steps of:

determining whether the restored image information is to be band-limited or not, based on said first information; and selecting either one of distortion-suppressed image information produced after the restored image information is band-limited in the time domain and the restored image information based on a result of said determining step.

15. A method according to claim 14, wherein said step of effecting motion compensation is effected after the compressed image information is decoded.

16. A method according to claim 14, wherein said step of effecting motion compensation comprises the steps of:

detecting, based on the restored image information and image information of frames preceding and following the restored image information, a first motion vector of the frame following the restored image information with respect to the restored image information, and detecting a second motion vector of the frame preceding the restored image information with respect to the restored image information;

effecting first motion compensation on the frame following the restored image information with respect to the restored image information according to said first motion vector; and effecting second motion compensation on the frame preceding the restored image information with respect to the restored image information according to said second motion vector.

17. A method according to claim 14, wherein said step of determining comprises comparing said threshold value with said differential information, and outputting said distortion-suppressed image information if said differential information is smaller than said threshold value.

18. A method according to claim 16, further comprising encoding said image information by compressing said image information and by transmitting the compressed image information.

19. A method according to claim 17, wherein said first information includes a likelihood ratio for motion vector detection, and said step of determining is operative on a basis of said likelihood ratio.

20. A method according to claim 17, wherein said first information includes editing information of the restored image information, and said step of determining is operative on a basis of said editing information.

21. A method according to claim 19, wherein said first information with respect to the restored image information includes a likelihood ratio for motion vector detection and editing information of the restored image information, and said step of determining comprises outputting said distortion-suppressed image information if said first differential information is smaller than said threshold and said second differential information is smaller than said threshold, and if said likelihood ratio for motion vector detection is high and said editing information does not include information indicating an editing point.

22. A method according to claim 18, wherein said step of detecting first and second motion vectors is effected before said image information is compressed, the first and second motion vectors are added to the compressed image information, and said first and second motion compensations are effected after the compressed image information is decoded.

23. A method according to claim 22, wherein said first information with respect to the restored image information comprises at least first differential information between first motion-compensated image information produced in said step of effecting first motion compensation and said restored image information, and comprises second differential information between second motion-compensated image information produced in said step of effecting second motion compensation and said restored image information, and said step of determining comprises comparing a threshold based on said quantizing value with said first differential information and said second differential information, and outputting said distortion-suppressed image information if said first differential information is smaller than said threshold and said second differential information is smaller than said threshold.

* * * * *